United States Patent
Pavlenko et al.

(10) Patent No.: US 9,626,163 B2
(45) Date of Patent: Apr. 18, 2017

(54) METHOD FOR AUTOMATED APPLICATION INTERFACE CHANGE

(71) Applicant: Limited Liability Company "1C", Moscow (RU)

(72) Inventors: Denis Anatolyevich Pavlenko, Moscow (RU); Oday Halikovich Derut, Moscow (RU)

(73) Assignee: Limited Liability Company "1C", Moscow (RU)

( * ) Notice: Subject to any disclaimer, the term of this patent is extended or adjusted under 35 U.S.C. 154(b) by 327 days.

(21) Appl. No.: 14/351,004

(22) PCT Filed: Jun. 18, 2013

(86) PCT No.: PCT/RU2013/000505
§ 371 (c)(1),
(2) Date: Apr. 15, 2014

(87) PCT Pub. No.: WO2014/175767
PCT Pub. Date: Oct. 30, 2014

(65) Prior Publication Data
US 2014/0325412 A1    Oct. 30, 2014

(30) Foreign Application Priority Data
Apr. 26, 2013   (RU) ................. 2013119434

(51) Int. Cl.
*G06F 9/44*    (2006.01)
(52) U.S. Cl.
CPC .............. *G06F 8/34* (2013.01); *G06F 9/4443* (2013.01)

(58) Field of Classification Search
CPC ......... G06F 3/0484; G06F 8/34; G06F 9/4443
USPC ....................................... 717/121
See application file for complete search history.

(56) References Cited

U.S. PATENT DOCUMENTS

| 7,624,375 | B2 * | 11/2009 | Santori | G06F 8/38 715/717 |
| 7,886,269 | B2 * | 2/2011 | Williams | G06F 8/00 717/106 |
| 8,020,094 | B2 * | 9/2011 | Mohan | G06F 17/24 715/255 |
| 8,209,660 | B2 * | 6/2012 | Sundararajan | G06F 8/71 717/105 |

(Continued)

*Primary Examiner* — Lewis A Bullock, Jr.
*Assistant Examiner* — Theodore Hebert
(74) *Attorney, Agent, or Firm* — Bardmesser Law Group

(57) ABSTRACT

A method for automated application interface change. The method enhances a set of technological tools and allows setting up an application interface in a flexible manner at a stage of implementation and execution. The method comprises: creating a separate system element preliminarily at the development stage; specifying its composing dependent elements and saving such separate element in the storing device; forming a special storage element for storing values of the separate system element; setting the value of the special system element at the stage of application implementation or execution; downloading the separate system element at the stage of the application execution; obtaining the value of the separate system element from the special value storage element; reconfiguring user interface elements connected with composing dependent elements based on the value of the separate system element.

8 Claims, 3 Drawing Sheets

(56) References Cited

U.S. PATENT DOCUMENTS

| | | | |
|---|---|---|---|
| 2002/0105548 A1* | 8/2002 | Hayton | G06F 8/38 |
| | | | 715/764 |
| 2004/0073565 A1* | 4/2004 | Kaufman | G06F 17/30572 |
| 2006/0036634 A1* | 2/2006 | Kristiansen | G06F 8/38 |
| 2006/0136830 A1* | 6/2006 | Martlage | G06F 17/243 |
| | | | 715/745 |
| 2006/0235548 A1* | 10/2006 | Gaudette | G06F 8/34 |
| | | | 700/83 |
| 2008/0140766 A1* | 6/2008 | Mohan | G06F 17/3089 |
| | | | 709/203 |
| 2011/0252397 A1* | 10/2011 | Hong | G06Q 10/06 |
| | | | 717/104 |
| 2014/0289621 A1* | 9/2014 | Sivakumar | G06F 3/0484 |
| | | | 715/704 |
| 2014/0325412 A1* | 10/2014 | Pavlenko | G06F 3/0484 |
| | | | 715/765 |
| 2015/0169652 A1* | 6/2015 | Nuraliev | G06F 17/30292 |
| | | | 707/805 |

* cited by examiner

METHOD FOR AUTOMATED APPLICATION INTERFACE CHANGE

CROSS-REFERENCE TO RELATED APPLICATIONS

This application is a U.S. National Phase of PCT Application No. PCT/RU2013/000505, filed Jun. 18, 2013, which claims priority to Russian Patent Application No. 2013119434, filed on Apr. 26, 2013, incorporated by reference herein in their entirety.

BACKGROUND OF THE INVENTION

Field of the Invention

This invention relates to the information technology, and more specifically to the method of automated interface change.

Description of the Related Art

The process of automated interface change requires a flexible and user-friendly way to configure the user interface at the stage of implementation or execution of business applications on computer systems, such as personal computers, laptops, etc.

"Implementation" refers to a process of deploying the software on computer systems and configuring software interface to a specific environment in order to be run by users. Conventional systems do not provide for an efficient and robust automated method for interface changes. Patent Application US No. 2011/252397 published on Oct. 13, 2011 offers a method for automated interface change that comprises receiving a request from a user; obtaining all system configurations capable of providing the requested service from a dynamic feature model; obtaining a corresponding configuration; reconfiguring resources of the system on the basis of the obtained configuration; and providing the requested service. As a result, the method provides services optimized for an environment that varies in real time without user interference.

However, this method has a limited use, since obtaining all system configurations to choose a corresponding configuration and reconfiguring system resources based on the obtained configuration significantly lengthens the process of changing the user interface and requires significant resources to store all possible configurations.

Accordingly, it is desired to have an efficient and a robust method for an automated interface change.

SUMMARY OF THE INVENTION

The present invention relates to the information technology, and more specifically to a method for automated interface change that substantially obviates one or more of the disadvantages of the related art.

In one aspect of the invention, a rapid and universal method for an automated application interface change is provided. The method enables a user to configure an application interface in a flexible and a user-friendly way, when implementing or executing the application.

According to an exemplary embodiment, an automated interface change method comprises the following phases: creating a separate system element preliminarily at the development stage, specifying its composing dependent elements and saving such separate element on the storage device; forming a special element to store values of the separate system element; setting the value of the special system element at the stage of application implementation or execution; downloading the separate system element at the stage of the application execution; obtaining the value of the separate system element from the special value storage element; reconfiguring user interface elements connected with composing dependent elements by using the obtained value of the separate system element.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Figure 1:
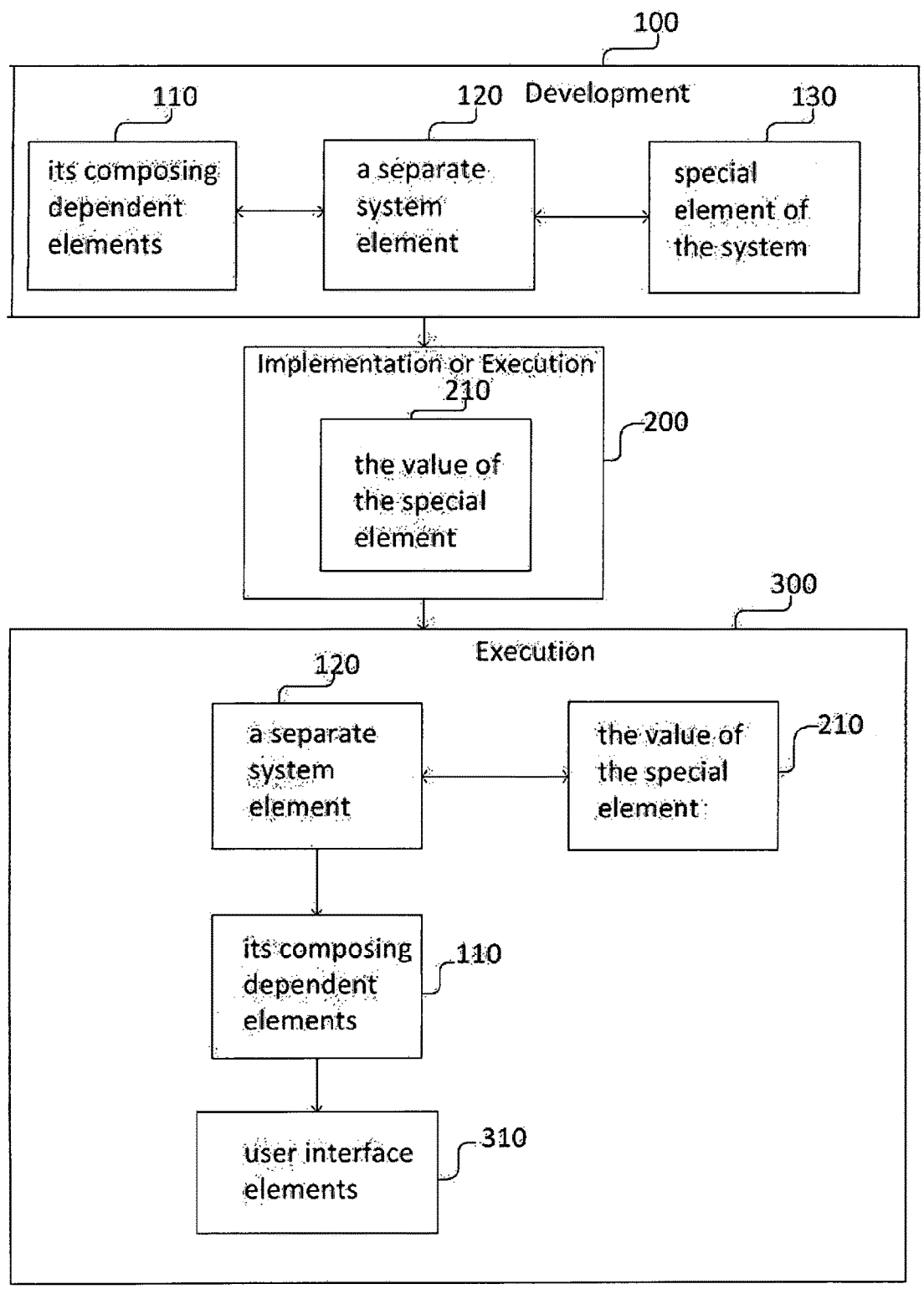
FIG. 1 is a block diagram illustrating a method of automated interface change, according to a first embodiment of the invention.

Reference will now be made in detail to the preferred embodiments of the present invention, examples of which are illustrated in the accompanying drawings.

According to an exemplary embodiment, an automated interface change method is provided. The method comprises the following phases: creating a separate system configuration element preliminarily at the development stage, specifying its composing dependent configuration elements and saving such separate element in the storing device; forming a special element to store values of the separate system configuration element (containing element value—i.e., functionality option); setting the value of the special system element at the stage of application implementation or execution (the value can be set by a user or by configuration of a particular system); downloading the separate system element at the stage of the application execution from a database; obtaining the value of the separate system configuration element from the special value storage element stored in the database; reconfiguring user interface elements connected with composing dependent elements, by using the obtained value of the separate system element. The elements are switched on/off using Boolean values (true/false).

According to another exemplary embodiment, the automated interface change method comprises the following phases: creating a separate system element preliminarily at the development stage (all GUI elements belong to configuration element), specifying its composing dependent elements and saving such separate element in the local storage device or in the remote network storage; creating an element parameterizing values of the separate system element (i.e., a named configuration element linked to other elements that store the values used as parameters and values of elements reflecting functionality options. This pair of parameters has a unique value); forming an element intended to store matches of parameter values with values of the separate system element; entering matches of parameter values with values of the separate system element at the stage of application implementation or execution (the values can be entered by a user via a text box, a list, a menu, a button, etc.); setting the parameter values at the stage of application execution; selecting the value of the separate system element corresponding to the specified parameter value from the element storing matches of parameter values with values of the separate system element; reconfiguring user interface elements connected with composing dependent elements by using the obtained value of the separate system element. The values are true/false, which indicates if the element is on or off.

A specific feature of both of the exemplary embodiments is that the system element depends on several separate elements. The parts of the interface connected with such system element are displayed, if it is permitted by at least one of these separate elements. The system checks all separate elements, and if at least one element has value "true" of the associated value storage element, the element is made accessible. The exemplary embodiment can be implemented on computers (e.g., personal computers, laptops, tablets, etc.) of a computing system designed for overall automation of processes related to economic and organizational activities, various types of accounting, financial and economic analyses within an enterprise system. The system exists as a set of invariable files and various software tools applied both by developers and users.

The system is logically divided into two parts that interact with each other. The parts are configuration utility (i.e., a utility assisting in configuring the system subject to the environment of any particular enterprise and tasks to be performed) and a platform to manage the configuration operations. The implementation of this invention requires a relevant database to store a set of data used to handle different tasks (e.g., task of production line automation, system control as well as other tasks).

The method of an automated interface change enables a fast configuration of the user interface during the implementation or system operations while providing flexible and user-friendly capabilities of setting up the interface by the user and capabilities of setting up the interface based on parameters of separate elements created in the system.

The method, in accordance with the exemplary embodiment, is intended for activating/deactivating the entire functional blocks without changing the application itself—i.e., without deleting or modifying any parts of the application software code. The GUI elements are turned off while other active elements are reconfigured. For instance, a developer can single out a capability of working with additional object properties, e.g., the "Goods" properties, as a separate system element. In this case, if the developer disables this capability, all capabilities related to additional "Goods" properties will be hidden in the system interface. With specified settings, the system automatically sets up a new state and makes the interface easier-to-understand, free from unnecessary elements and convenient to work with.

FIG. 1 is a logic block diagram illustrating a method of automated interface change, according to a first embodiment of the invention. The method comprises creating a separate system element 120 preliminarily at the development stage, specifying its composing dependent elements 110 and saving such separate element in the storing device. It is also necessary to specify in this element which other system elements it influences. Different system elements, such as attributes, commands can be part of separate system elements. Attributes are catalogue or document fields that are displayed on a form for the user to read or complete. The command is a configuration object used by the developer to describe actions to be performed by the user.

Then, a special element 130 is formed to store values of the separate system element 120. This special element 130 has a required property to be specified—the storage property, for which one can select an object to serve as a source of element values. One can select, for example, such objects as constants, catalogue attributes, and information register resources. Constants store values that change rarely, for example, Organization Name, Tax Payer Number, Director Name, etc. Catalogues are tools used to work with a list of homogeneous elements of data. Any catalogue has two required attributes—"Code" and "Name," that are created automatically.

Other catalogue attributes that may contain some other information in addition to the name should be determined for each specific catalogue being created. Information registers are intended to store information deployed by a combination of dimensions. Register resources are a quantitative or an integral data stored in the register. To manage the interface, only the separate elements whose values are stored in Boolean-type attributes can be used.

At the implementation or execution stage 200, the application sets up a value of the special system element 210. At the stage of the application execution 300, the separate element 120 created in the system is downloaded, the separate element value is obtained from the special value storage element 130, and user interface elements 310 corresponding to composing dependent elements 110 are reconfigured based on the obtained value of the special element 210. In a particular case, the user interface element 310 that depends on several separate elements or is a part of several separate elements 120 will be displayed, if it is permitted at least by one of those separate elements 120.

The first embodiment of the invention can be exemplified by a task when it is required, depending on the environment of a particular implementation, to provide for disabling the capability of customer accounting by divisions serving such customers, so that "the Division" field is not displayed in the document form when the document is handled. To this end, a separate element 120—"the Accounting by Division" element should be created.

A dependent system element 110 (e.g., the "Client Receipt" document attribute) should be specified in the separate element composition. Then, a special element 130—"the Accounting by Division" constant, is formed to store sources of Boolean-type system element values. The special element value element 210 is set to "False" at the implementation or execution stage 200 and 300, this disables "the Accounting by Division" separate element 120 and the system automatically reconfigures the representation of all interface elements 310 composing the separate element 120, such as, for example, fields, commands, report elements, in this particular case the user interface hides "the Division" field.

Figure 2:
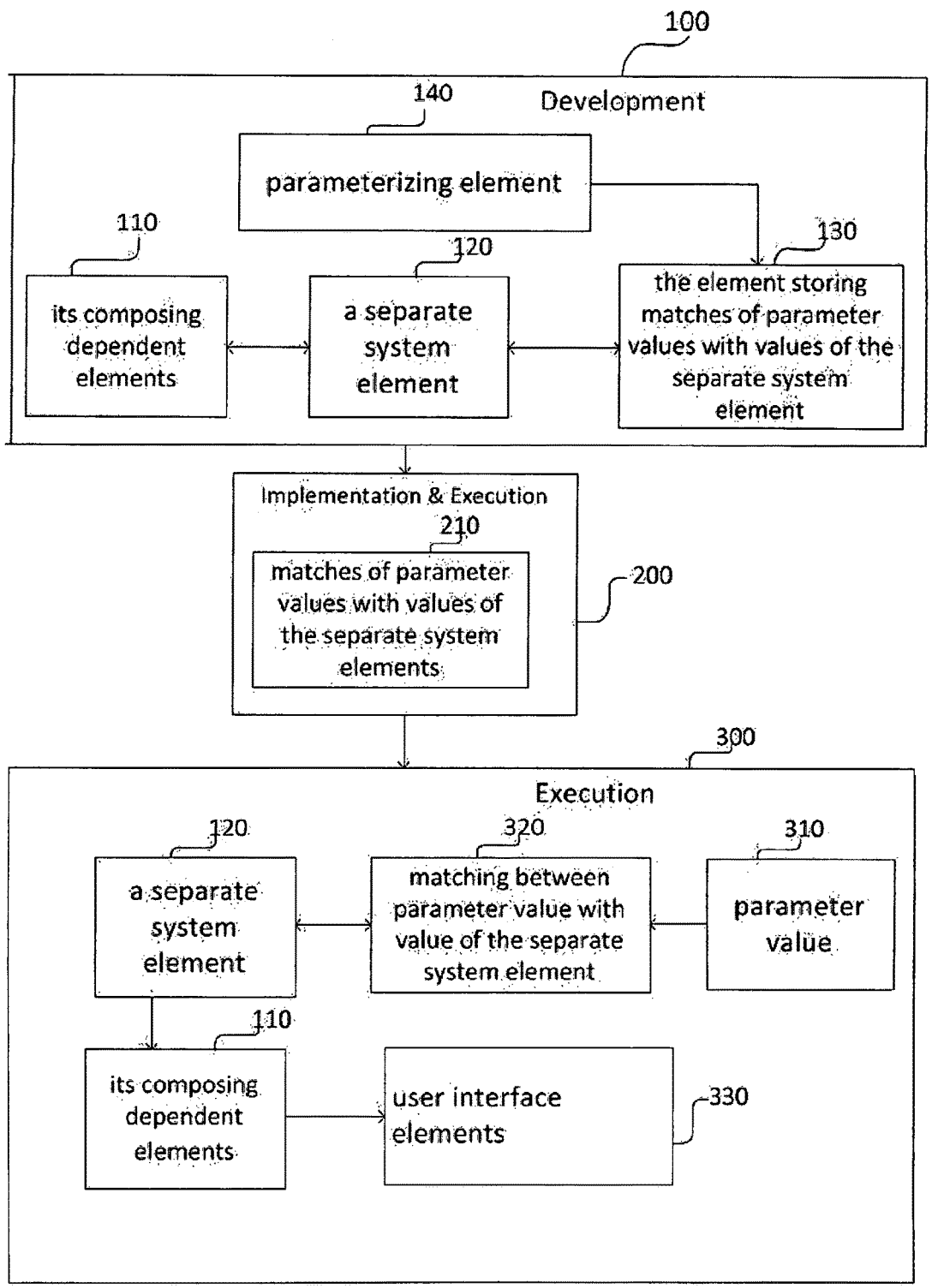
FIG. 2 is a block diagram illustrating a method of automated interface change, according to a second embodiment of the invention.

Regarding the second embodiment of this invention, the separate element value 120 depends on some parameters (i.e., name of an enterprise, name of the storage facility, etc.) To implement this dependency, special elements parameterizing values of separate system elements are used. FIG. 2 is a logic block diagram illustrating a method of automated interface change, according to a second embodiment of the invention. This method comprises creating a separate system element 120 preliminarily at the development stage 100, specifying its composing dependent elements 110, and saving such separate element on the storage device.

Then, the element parameterizing values 140 of the separate system element 120 are created (i.e., for example, the values can indicate a name of the enterprise and if the enterprise has a dollar or euro account). This element specifies a set of objects whose values determine the selection of separate element values. The list of available objects includes catalogues and dimensions of the information register. In this case, register dimensions show the view points that should be used to store the information. One catalogue from the overall list of catalogues and one dimension from each information register can be selected per each parameter value in this list.

For example, if a separate element 120 is stored in the catalogue attribute, then the parameter should contain a link to a particular catalogue element. If the separate element 120 is stored in the resource of the information register, values of all register dimensions should be specified. In this case, every dimension should be characterized by its parameter. Parameters make it possible to create separate system elements with a result that is not set just once at the implementation stage, but that can vary based on data stored in the database, based on the parameter of the separate system element 120.

The next steps include forming an element intended to store matches of parameter values with values of the separate system element 130 and entering matches of parameter values with values of the separate system elements 210 at the stage of application implementation or execution 200. Then, the parameter value 310 at the stage of the application execution element 300 should be set.

The value of the separate element 320 corresponding to the specified parameter value element 310 is selected from the element storing matches of parameter values with values of the separate system element 130. Then, user interface elements 330 connected with composing dependent elements 110 are reconfigured based on the separate system element value 120.

If not all parameters are specified for a separate element 120 of the Boolean type, then "the OR" operation for all values with unspecified parameters is performed. For example, if a separate element 120 is stored in the information register with "the Organization" dimension and "the Warehouse" dimension, and only "the Organization" dimension is specified, then the value of the separate element 120 will be "True" provided that the separate element value element 120 for at least one of the warehouses listed in "the Warehouse" dimension is "True."

Another embodiment of the invention can be exemplified by a task when it is required to display or hide "the VAT Rate" field in documents depending on the organization for which the goods receipt is registered. If the organization maintains separate tax accounting, "the VAT Rate" field should be displayed to enable the user to choose a common (default) or any other (e.g., reduced) rate.

If the organization does not maintain separate accounting, this field should be hidden as a default "VAT rate" is used. To achieve this goal, the method requires creating a separate element—i.e., "the Separate VAT Accounting" element 120, specifying its composing dependent elements 110, and saving the created element in the storing device. The next step is to create the "Organization" element 140 parameterizing values of the separate element 120, and to form the element for storing matches of parameter values with the values of the separate element 130.

Thus, the value of the separate element 120 will be stored in "the Catalogue Organizations Attribute Separate VAT Accounting" catalogue attribute of the Boolean type. At the stage of the application implementation or execution 200 and 300, "the Organization" parameter value 310 is set up, and the corresponding "False" or "True" value is selected. Then, if the organization does not maintain a separate tax accounting, "the VAT Rate" field is hidden, but if it does, this field is displayed. Similar to the first embodiment example, the user interface element that depends on several separate elements or is a part of several separate elements is displayed, if it is permitted at least by one of these separate elements 120.

Figure 3:
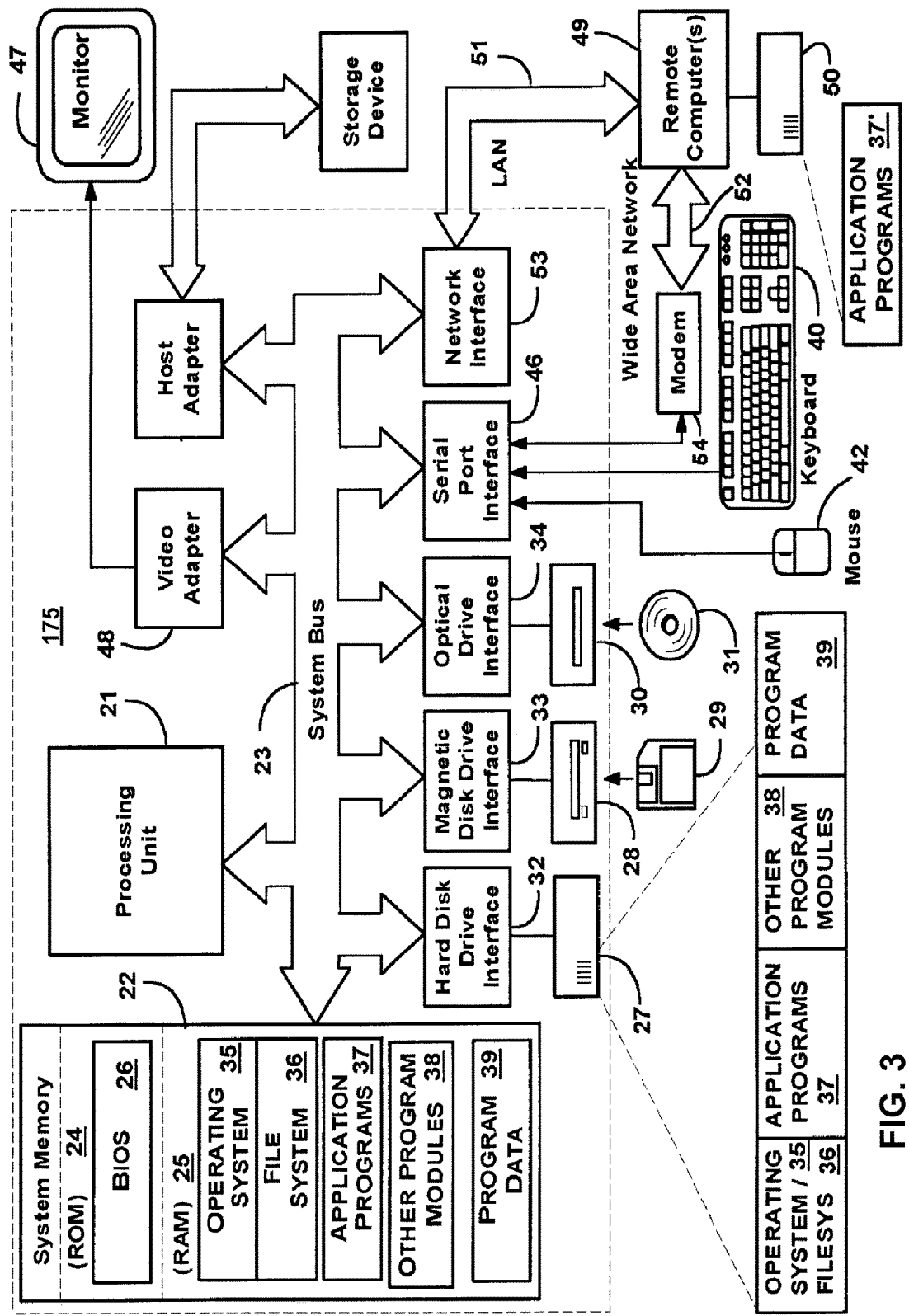
FIG. 3 illustrates a schematic diagram of an exemplary computer or server that can be used in the invention.

FIG. 3 illustrates a schematic diagram of an exemplary computer or server that can be used in the invention. With reference to FIG. 3, an exemplary system for implementing the invention includes a general purpose computing device in the form of a personal computer (or a node) 20 or server or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25.

A basic input/output system 26 (BIOS), containing the basic routines that help to transfer information between elements within the computer 20, such as during start-up, is stored in ROM 24. The personal computer/node 20 may further include a hard disk drive for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media.

The hard disk drive, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably WINDOWS™ 2000). The computer 20 includes a file system 36 associated with or included within the operating system 35, such as the WINDOWS NT™ File System (NTFS), one or more application programs 37, other program modules 38 and program data 39. A user may enter commands and information into the personal computer 104 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48.

In addition to the monitor 47, personal computers typically include other peripheral output devices (not shown), such as speakers and printers. A data storage device, such as a hard disk drive, a magnetic tape, or other type of storage device is also connected to the system bus 23 via an interface, such as a host adapter via a connection interface, such as Integrated Drive Electronics (IDE), Advanced Technology Attachment (ATA), Ultra ATA, Small Computer System Interface (SCSI), SATA, Serial SCSI and the like.

The computer 20 may operate in a networked environment using logical connections to one or more remote computers. The remote computer (or computers) may be another personal computer, a server, a router, a network PC, a peer device or other common network node, and typically includes many or all of the elements described above relative to the computer 20.

The computer 20 may further include a memory storage device 50. The logical connections include a local area network (LAN) 51 and a wide area network (WAN) 52. Such networking environments are commonplace in offices, enterprise-wide computer networks, Intranets and the Internet. When used in a LAN networking environment, the personal computer 20 is connected to the local area network 51 through a network interface or adapter 53.

When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means for establishing a communications link between the computers may be used.

Those skilled in the art will appreciate that methods of automated interface change offered by this invention enhances the set of technological tools and allows setting up the user interface in a flexible manner at the stage of implementation and execution.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention.

What is claimed is:

1. A computer-implemented method for an automated application interface change based on dynamically changed parameters, the method comprising:
    creating at least one separate system element at an application development stage, in response to a developer configuring an accounting system using a configuration utility of the accounting system;
    specifying dependent elements corresponding to the at least one separate system element, in response to a developer configuring the accounting system at the application development stage,
    wherein the dependent elements are selected by the developer from a then-current list of available system elements within the accounting system;
    at the application development stage, generating a storage element for storing matches of parameters values and values of the separate system element, wherein the matches map parameter values to separate system element values, in response to a developer configuring the accounting system, wherein the values of each of the parameters, the separate system element value, and the matches, are stored in fields in a database;
    at the application development stage, creating at least one parametrizing element corresponding to a parameter, in response to a developer configuring the accounting system;
    wherein each parameterizing element specifies at least one of a link to a particular catalogue element from an overall list of catalogues and a register dimension specifying view points for storing information;
    saving the at least one separate system element and the at least one parametrizing element on a storage device in a database;
    in response to input from an administrator, entering the matches of the parameters values with values of the separate system element at an application implementation stage and storing the matches;
    in response to a change in end user configuration, downloading a parametrizing element and setting its value as a current parameter value at application execution using a management platform of the accounting system;
    downloading the separate system element at the application execution;
    obtaining the value of the separate system element from the stored match of the parameter value with value of the separate system element using a current parameter value; and
    at the application execution, reconfiguring visible application user interface elements corresponding to the dependent elements, which are shown to the end user, based on the obtained values of the separate system element,
    wherein each of the dependent elements corresponds to an application interface element or a group of such interface elements,
    wherein a single dependent system element depends on multiple separate system elements, and the corresponding application interface elements are shown to the user if any of the matching parameter elements' values are True, and not shown to the user if all of the matching parameter elements' values are False, and
    wherein the application interface elements include fields, commands and reports.

2. The method of claim 1, wherein the visible application interface element is displayed, if it is permitted by at least one of the separate system elements.

3. The method of claim 1, wherein re-setting the value of a parametrizing element at application execution results in obtaining a new value of the separate system element and reconfiguring visible application interface elements based on the new value.

4. The method of claim 1, wherein, in response to a change in end user configuration, when none of parametrizing elements' values are set at the application execution stage, then a particular separate system element is set to True and a corresponding visible application interface element is displayed if a match result is True for any of the parameters values entered at an application implementation stage, and the corresponding visible application interface element is not displayed otherwise.

5. A system for an automated application interface change comprising: a processor; a memory coupled to the processor; a computer program logic stored in the memory and executed on the processor, the computer program logic is configured to execute the steps of claim 1.

6. The system of claim 5, wherein the visible application interface element is displayed, if it is permitted by at least one of the separate system elements.

7. The system of claim 5, wherein re-setting the value of a parametrizing element at application execution results in obtaining a new value of the separate system element and reconfiguring visible application interface elements based on the new value.

8. The system of claim 5, wherein, in response to a change in end user configuration, when none of parametrizing elements' values are set at the application execution stage, then a particular separate system element is set to True and a corresponding visible application interface element is displayed if a match result is True for any of the parameter values entered at an application implementation stage, and the corresponding visible application interface element is not displayed otherwise.

* * * * *